United States Patent
Fafard et al.

(10) Patent No.: US 10,156,316 B2
(45) Date of Patent: Dec. 18, 2018

(54) BOAT LIFT

(71) Applicant: Chaparral Boats, Inc., Nashville, GA (US)

(72) Inventors: Michael J. Fafard, Nashville, GA (US); William S. Pegg, Nashville, GA (US); Anthony Tillman Lanier, Nashville, GA (US); David Paul Money, Nashville, GA (US)

(73) Assignee: Chaparral Boats, Inc., Nashville, GA (US)

( * ) Notice: Subject to any disclaimer, the term of this patent is extended or adjusted under 35 U.S.C. 154(b) by 0 days.

(21) Appl. No.: 14/744,700

(22) Filed: Jun. 19, 2015

(65) Prior Publication Data

US 2016/0369939 A1 Dec. 22, 2016

(51) Int. Cl.
*B63C 3/00* (2006.01)
*F16M 11/20* (2006.01)
*F16M 11/18* (2006.01)
*B63C 3/02* (2006.01)

(52) U.S. Cl.
CPC ........... *F16M 11/2014* (2013.01); *B63C 3/02* (2013.01); *F16M 11/18* (2013.01)

(58) Field of Classification Search
CPC ............................ F16M 11/18; F16M 11/2014
USPC ....... 414/678, 474, 476, 482, 483, 803, 812; 280/414.1, 414.2
See application file for complete search history.

(56) References Cited

U.S. PATENT DOCUMENTS

| | | | | |
|---|---|---|---|---|
| 2,919,825 A * | 1/1960 | Hornsby | ............... | B60P 3/1033 414/474 |
| 2,977,011 A * | 3/1961 | Okerlund | ............. | B60P 3/1058 414/477 |
| 3,082,892 A * | 3/1963 | Cox | ...................... | B60P 3/1033 280/414.1 |
| 3,227,292 A * | 1/1966 | Jacobs | ..................... | B63C 3/02 405/1 |
| 3,844,421 A * | 10/1974 | Nielsen | .................... | B60S 13/00 187/211 |
| 4,348,054 A * | 9/1982 | Shonkwiler | ............... | B60P 1/34 298/11 |
| 4,641,996 A * | 2/1987 | Seal | ......................... | B63C 3/06 187/245 |
| 5,051,056 A * | 9/1991 | Gibbons | ................. | B66C 23/48 248/201 |
| 5,108,248 A * | 4/1992 | Murrill | ..................... | B60P 3/06 414/462 |
| 5,281,077 A * | 1/1994 | Phillips | .................... | B66F 7/02 187/242 |
| D344,834 S * | 3/1994 | Ries | ............................ | D12/317 |
| 5,474,416 A * | 12/1995 | Rogge | ..................... | B60P 1/025 414/481 |
| 5,649,802 A * | 7/1997 | Babcock | ................ | B60P 1/025 414/483 |
| 5,653,566 A * | 8/1997 | Williams | ................. | B60P 3/10 280/402 |
| 5,890,835 A * | 4/1999 | Basta | ....................... | B63C 3/06 114/44 |

(Continued)

*Primary Examiner* — Charles A Fox
*Assistant Examiner* — James Buckle, Jr.
(74) *Attorney, Agent, or Firm* — Fish & Richardson P.C.

(57) ABSTRACT

In one aspect, a boat lift includes a base, a boat support pivotally attached to a given portion of the base, and one or more stabilizers extending from the given portion of the base.

14 Claims, 6 Drawing Sheets

(56) References Cited

U.S. PATENT DOCUMENTS

| | | | | |
|---|---|---|---|---|
| 6,003,888 A * | 12/1999 | Godbersen | B60G 11/225 |
| | | | 267/276 |
| 6,238,166 B1 * | 5/2001 | Collier | B60P 1/08 |
| | | | 298/17 R |
| 6,257,167 B1 * | 7/2001 | Joaquim | B60P 3/1033 |
| | | | 114/344 |
| 6,318,929 B1 * | 11/2001 | Basta | B63C 3/00 |
| | | | 114/44 |
| 6,520,728 B1 * | 2/2003 | Schwitters | B63C 3/02 |
| | | | 114/44 |
| 7,143,713 B1 * | 12/2006 | Richardson | B60P 3/1033 |
| | | | 114/344 |
| 9,321,388 B2 * | 4/2016 | Barnett | B60P 3/122 |
| 2004/0101389 A1 * | 5/2004 | Godbersen | B62D 63/062 |
| | | | 414/482 |

* cited by examiner

BOAT LIFT

BACKGROUND

This specification relates to boat lifts.

Boat lifts provide a stationary mechanism to elevate a boat. In some instances, the boat may be lifted out of water. In other instances, the boat may be lifted off of the ground to place on a fork lift or in a dry storage rack.

SUMMARY

In general, one innovative aspect of the subject matter described in this specification can be embodied in a boat lift that include a base; a boat support pivotally attached to a given portion of the base; and one or more stabilizers extending from the given portion of the base. Other embodiments of this aspect include corresponding systems, apparatus, and methods.

These and other embodiments can each optionally include one or more of the following features. The one or more stabilizers can be arranged to prevent the base from rotating about the given side when the boat support pivots at the given side. The base can include at least one stabilizer attachment point at which the one or more stabilizers are attached to the given side of the base. The stabilizer attachment point can include a stabilizer slot into which the one or more stabilizers are inserted to attach the one or more stabilizers to the base.

The boat lift can include a lift support structure that extends between the base and the boat support when the boat support is positioned at a given angle relative to the base and maintains the given angle between the boat support and the base. The lift support structure can be pivotally attached to an interior portion of the base and pivots to engage the boat support at the given angle.

The boat lift can include a lift mechanism connected to each of the base and the boat support in a manner that enables the lift mechanism to position the boat support at various angles relative to the base.

The boat lift can include a support structure that extends between the lift mechanism and the base when the boat support is positioned at a given angle relative to the base. The lift mechanism can include an actuator connected between the boat support and the base in a manner that enables the actuator to position the boat support to at least a 45 degree angle relative to the base.

The boat lift can include one or more frame stops attached to the boat support and extending away from a plane of the boat support. The one or more frame stops can be attached to the boat support at locations at which crossbars of a boat trailer will be positioned upon mounting the boat trailer on the boat lift. The one or more frame stops can be attached to the boat support in a manner that causes the one or more frame stops to engage a boat trailer when the boat support is pivoted relative to the base.

The boat lift can include a securing member attached to the boat support, wherein the securing member is configured to attach to a boat supported by the boat support. The securing member can be a strap that connects between stern eyes of the boat and a given portion of the boat support.

The given portion of the base can be located between two ends of the base. The one or more stabilizers can include one of the two ends.

In general, another aspect of the subject matter described in this specification can be embodied in methods that include the actions of forming a base; forming a boat support that is pivotally attachable to a given portion of the base; and forming one or more stabilizers that are configured to extend from the given portion of the base. Other embodiments of this aspect include corresponding devices, systems, and apparatus, configured to perform the actions of the methods.

These and other embodiments can each optionally include one or more of the following features. Methods can include the actions of pivotally attaching the boat support to the base at a given end of the base; and attaching the one or more stabilizers to an exterior side of the given end.

Attaching the one or more stabilizers to the exterior side of the given end can include inserting a stabilizer into a stabilizer slot that is formed in the base.

Forming a base can include forming a support structure that extends from the base and engages a lift mechanism that positions the boat support at a given angle relative to the base.

Forming the support structure can include forming the support structure to be pivotally attached to the base.

Methods can include the actions of forming one or more frame stops attachable to the boat support. The frame stops can be formed to extend away from a plane of the boat support. The frame stops can be formed to engage a boat trailer when the boat support is positioned at a given angle relative to the base.

Particular embodiments of the subject matter described in this specification can be implemented so as to realize one or more of the following advantages. Enabling the support of a boat (e.g., by supporting a hull of the boat or supporting a trailer in which a boat is mounted) at a given angle (e.g., non-zero angle) relative to the ground. The boat can be supported at the given angle for any amount of time. Supporting a boat at a given angle enables display of the boat in less square footage than that required to display the boat on a substantially level surface (e.g., relative to the ground).

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This document describes a boat lift and/or display device that can support a boat (e.g., by supporting a hull of the boat or supporting a trailer in which a boat is mounted) at a given angle relative to the ground. In some implementations, the boat lift can support the boat at an angle ranging up to at least sixty degrees relative to the ground (or another planar reference on which a base of the boat lift is situated).

In some implementations, the boat lift can include a lifting mechanism that is used to change the angle at which the boat is supported and/or displayed. For example, the lifting mechanism can elevate one end of a boat support, while an opposing end of the boat support (e.g., an end of the boat support that is pivotally attached to a given side of the base) remains pivotally attached to the base of the boat lift. As discussed in more detail below, the boat lift can also include one or more stabilizers that are attached to (or formed as part of) the base, and may operate to prevent the boat display from tipping over when the boat is supported/displayed at various angles relative to the ground or other planar references.

Figure 1:
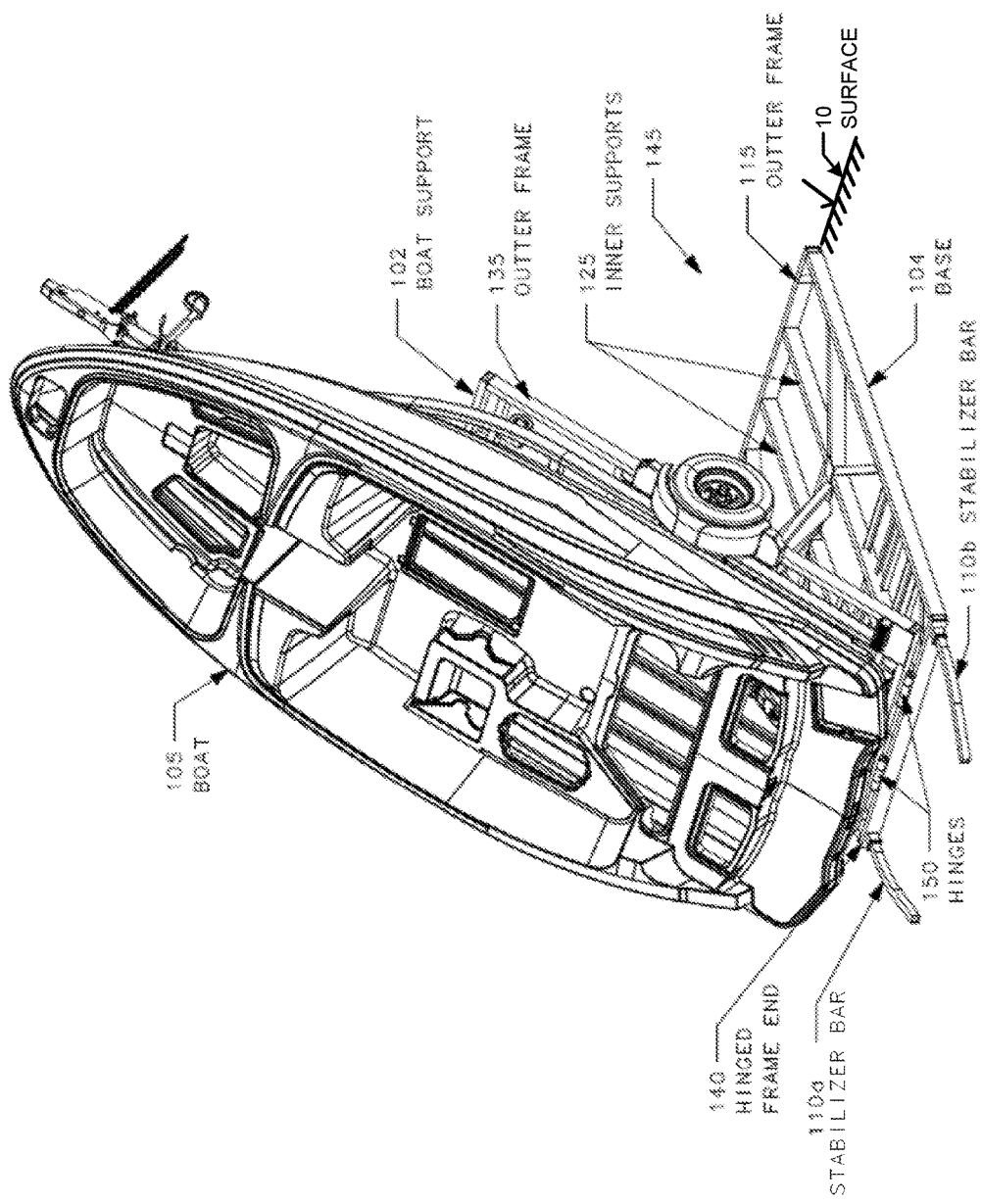
FIG. 1 is a diagram of an example boat lift.

FIG. 1 is an illustration of an example boat 105 on a boat lift 100. The boat lift 100 has a base 104 and a boat support 102. The base 104 and the boat support 102 can be formed out of metal, such as aluminum, steel, stainless steel, or another metals. The base 104 and the boat support 102 can alternatively (or additionally) be made out of other materials such as fiberglass, plastic, or wood depending on the load that will be supported by the boat lift.

The base 104 has an outer frame 115, which can be rectangular (as shown) or formed in other configurations, such as oval, circular, rounded, or another shape. The base 104 can also have one or more inner support members 125 that increase the stability of the base 104. For example, the inner support members 125 are configured between the outer frame 115 of the base 104 to prevent the sides of the outer frame from flexing relative to other sides of the outer frame.

The boat support 102 can also have an outer frame 135, which can also be formed in various shapes similar to those discussed above with reference to the base 104. Generally, the boat support 102 will have a same or similar shape as the base 104, but it is not required that the boat support 102 and the base 104 have the same or similar shape.

In some implementations, the boat support 102 is pivotally attached to a hinged frame end 140 (also referred to as a given end) of the base 104. Pivotally attaching the boat support 102 to the hinged frame end 140 enables an opposite end 145 of the boat support to be elevated relative to the base 104 and/or a surface 10 on which the base 104 is resting or attached (e.g., the ground, a floor, or a platform).

In some implementations, the boat support 102 is pivotally attached to the base 104 by a connecting mechanism. For example, the boat support 102 can be attached to the base with connecting bars, an eye hole and a pin configuration, brackets, a hinge mechanism, or any other mechanism that enables a pivotal motion between the boat support 102 and the base 104. As illustrated in FIG. 1, the boat support 102 and the base 104 are connected by hinges 150. The hinges 150 enable the opposite end 145 of the boat support 102 to be elevated while still being attached to the base 104 at the hinged frame end 140 (as shown in FIG. 1).

The boat support 102 structurally supports the boat 105 while it is on the lift 100. In some implementations, the boat support 102 is configured to support a trailer on which the boat 105 is resting. For example, as discussed with reference to FIG. 2, portions of the boat support 102 can engage a trailer frame to support the trailer and the boat.

In some implementations, the boat support 102 supports the boat 105 as the boat's hull rests directly onto the boat support 102. For example, the boat support 102 could be formed to have a shape similar to that of the boat hull, thereby enabling the boat support 102 to directly support the hull of the boat.

In some implementations, the base 104 includes two stabilizer bars 110a and 110b that each extend longitudinally from of the base 104. The two stabilizer bars 110a and 110b can be removable or permanently attached to the base 104. In some implementations, the stabilizer bars 110a and 110b are cylindrical rods or square rods, but other shapes of stabilizer bars can be used. In some implementations, the stabilizer bars 110a and 110b extend out straight from the base 104. In some implementations, the stabilizer bars 110a and 110b are curved or bent as shown in FIG. 1. The curve can include any angle (e.g., 5, 15, 30, 45, 60 degrees, etc.) suitable to enable stabilization of the boat lift 100. The stabilizer bars can curve inward or outward (e.g., toward an inner axis of the base 104 or away from an inner axis of the base 104).

The two stabilizer bars 110a and 110b are arranged to prevent the base 104 from rotating about a given side 140 when the boat support 102 pivots at the given side 140 to lift the boat to a given angle relative to the base 104. In addition, the two stabilizer bars 110a and 110b prevent the base from tipping over or moving radially about a given axis.

In some implementations, the boat support 102 can be pivotally connected to another portion of the base 104 (e.g., other than the given end 140). For example, the boat support 102 could be pivotally connected to a cross-support (not shown) or another given portion of the base 104 located between the hinged frame end 140 (e.g., the given end) and the opposite end 145 of the base 104. In such implementations, the stabilizer bars 110a and 110b may be omitted, such that a segment of the base 104 extending from the hinged frame end 140 to the pivotal connection between the boat support and the base would stabilize the boat lift when the boat was lifted. Thus, this segment of the base would constitute a stabilizer that extends from the given portion of the base at which the boat support is connected.

Figure 2:
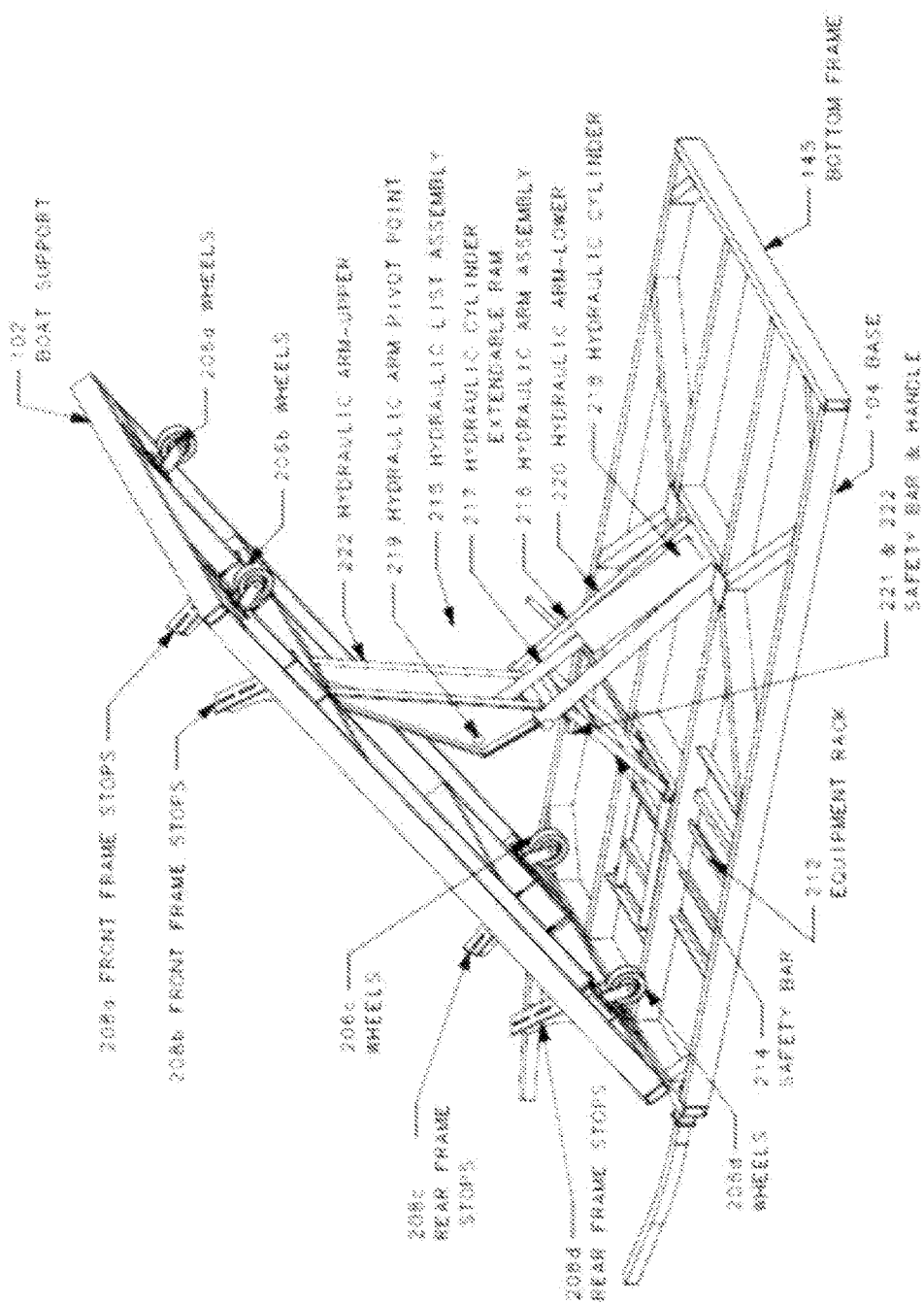
FIG. 2 is a diagram of the example boat lift.

FIG. 2 is an illustration of an example boat lift 100. As discussed above with reference to FIG. 1, the boat lift 100 includes a boat support 102 and a base 104. The boat support 102 can include wheels 206a-d attached to the underside of the boat support 102. In some implementations, the wheels 206a-d can be independently attached to the boat support 102 such that each wheel moves and rotates independently of the other wheels attached to the boat support 102. The wheels 206a-d can be placed at multiple locations of the boat support to ensure that the load of the boat is distributed among the multiple locations. In some implementations, the wheels 206a-d can be attached to the base 104 of the boat lift 100. The wheels 206a-d enable the boat lift 100 to be moved to various locations.

The wheels 206a-d can include an axle (not shown) between opposing wheels 206a and b, 206c and d. In some implementations, the axle (not shown) can be affixed between the two opposing wheels 206a, b such that the opposing wheels rotate in unison. For example, as wheel 206a rotates 30 degrees to the right to turn the boat lift 100, wheel 206b also rotates 30 degrees to the right enabling boat lift 100 to easily move the opposite end 145.

The boat lift 100 can include front and rear frame stops 208a-d affixed to (or formed as part of) the top of the boat support 102. The frame stops 208a-d are typically attached to the inner support members 125 of the boat support 102. For example, as discussed below in connection to FIG. 3, the frame stops 208a-d can be attached to the boat support 102 using various connecting mechanisms.

Typically, the frame stops 208a-d function as a support for a boat and/or a boat trailer that is mounted to or resting on top of the boat support 102. For example, as the boat support 102 is lifted (e.g., to lift the boat at an angle relative to the base), the boat and/or boat trailer engage the frame stops 208a-d, which prevent the boat from sliding off of the boat support and support the weight of the boat and/or the trailer. During the loading procedure of the boat trailer on the boat lift, longitudinal bars of the boat trailer (e.g., bars that extend between starboard and port sides of a mounted boat) are typically situated against a given side 210 (e.g., a front side that faces away from the pivotal engagement between the boat support 102 and base 104) of each of the frame stops 208a-d. As the end 145 of the boat support 102 is elevated, the boat trailer engages and/or rests against the frame stops 208a-d.

The frame stops 208a-d can also facilitate proper positioning of the boat over the boat support 102 prior to lifting the boat. For example, the frame stops 208a-208d can be used as a visual guide to position the boat over the appropriate portion of the boat lift by generally aligning portions of the trailer (e.g., crossbars) with the frame stops 208a-208d.

The base 104 of the boat lift 100 can include an equipment rack 212 to hold auxiliary equipment used for lifting the boat support 102 relative to the base 104. In some implementations, the equipment rack is situated in a fixed location. For example, the equipment rack 212 can be permanently affixed to the base 104. In some implementations, portions or all of the auxiliary rack 212 can be affixed to the base 104, thereby enabling the equipment rack 212 to be relocated to a different location of the base 104.

The boat lift 100 can include a lifting mechanism that is connected between the base 104 and the boat support 102. In some implementations, the lifting mechanism is connected in a manner that enables the lifting mechanism to lift one end of the boat support relative to another end. The lifting mechanism can include a hand crank lift, an electric lift, a jack lift, or any other mechanism of the like. FIG. 2 depicts a hydraulic lifting system 215 as an example of a lifting mechanism that can be used. The hydraulic lifting system 215 includes a hydraulic arm 216 and a hydraulic cylinder 218 that lifts one side of the boat support 102 while the opposing side remains connected to the base 104.

In some implementations, a hydraulic arm 216 can include one or more sections. For example, the hydraulic arm 216 can include two sections, an upper section 222 and a lower section 220 coupled at the middle. In some implementations, the hydraulic arm 216 is connected in the middle via a pivoting connecting mechanism 219, such as a hinge, a slot and pin, a common bar connecting both sections utilizing a coupling, or any other rotating or flex connecting means of the like.

Each the opposing ends of the hydraulic arm 216 are respectively connected to the base 104 and the boat support 102. In some implementations, the upper section 222 connects to the boat support 102 and is coupled with a similar pivoting connecting mechanism 219 as the middle adjoined connection. This enables the upper section 222 to connect to the boat support 102 and to rotate as the opposite end 145 of the boat support 102 is lifted. Similarly, the lower section 120 is coupled to the base 104 in a similar pivoting manner that the upper section 222 is connected to the boat support.

In some implementations, the hydraulic lifting system 215 includes a hydraulic cylinder 218 that is connected to the base 104 and the upper section 222 of the hydraulic lifting system 215. Typically, the hydraulic cylinder 218 is operated using auxiliary equipment that resides on the equipment rack 212. For example, the hydraulic cylinder 218 can utilize hydraulic fluid to extend the extendable portion 217 of the hydraulic cylinder 218 thereby lifting end 145 of the boat support 102.

In some implementations, the hydraulic cylinder 218 is a component connected to each of the base 104 and the boat support 102 in a manner that enables the lifting mechanism to position the boat support at various angles relative to the base 104.

In some implementations, the extendable portion 217 of the hydraulic cylinder 218 can be an actuator. As previously stated, the actuator is connected between the boat support 102 and the base 104 in a manner that enables the actuator to position the boat support to at least a 60 degree angle relative to the base 104. In some implementations, the actuator may position the boat support to an angle less than or more than 60 degrees relative to the base 104.

The boat lift 100 can include a safety bar 214. In some implementations, the safety bar 214 is a support structure that is pivotally attached to an interior portion of the base 104 and pivots to engage the boat support 102 at the given angle relative to the base 104. Generally, the safety bar 214 rests in a horizontal laying position within a hollow compartment of the base 104 when it is not in use. In some implementations, the safety bar 214 has an elongated bar 221 that extends from the main portion of the safety bar to the one edge of the base. The elongated bar is bent at a 90 degree angle to form a handle 223 for lifting and securing the safety bar 214.

In some implementations, the safety bar 214 can be pivotally attached to the bottom of the boat support 102. In these implementations, the safety bar can be lowered to engage the base 104 as the angle between the boat support 102 and the base 104 is increased. For example, the base 104 can have safety bar engagement members (e.g., slots, impressions, or raised portions) (not shown) at various intervals within the base that the safety bar engages. As the boat support 102 pivots to different angles, the safety bar can engage with different members to support the angle of the boat support 102.

In some implementations, the safety bar can be attached to the boat support 102 or the base 104 in other configurations such that when the boat support is positioned at a given angle relative to the base, the safety bar maintains the given angle between the boat support 102 and the base 104.

Figure 3:
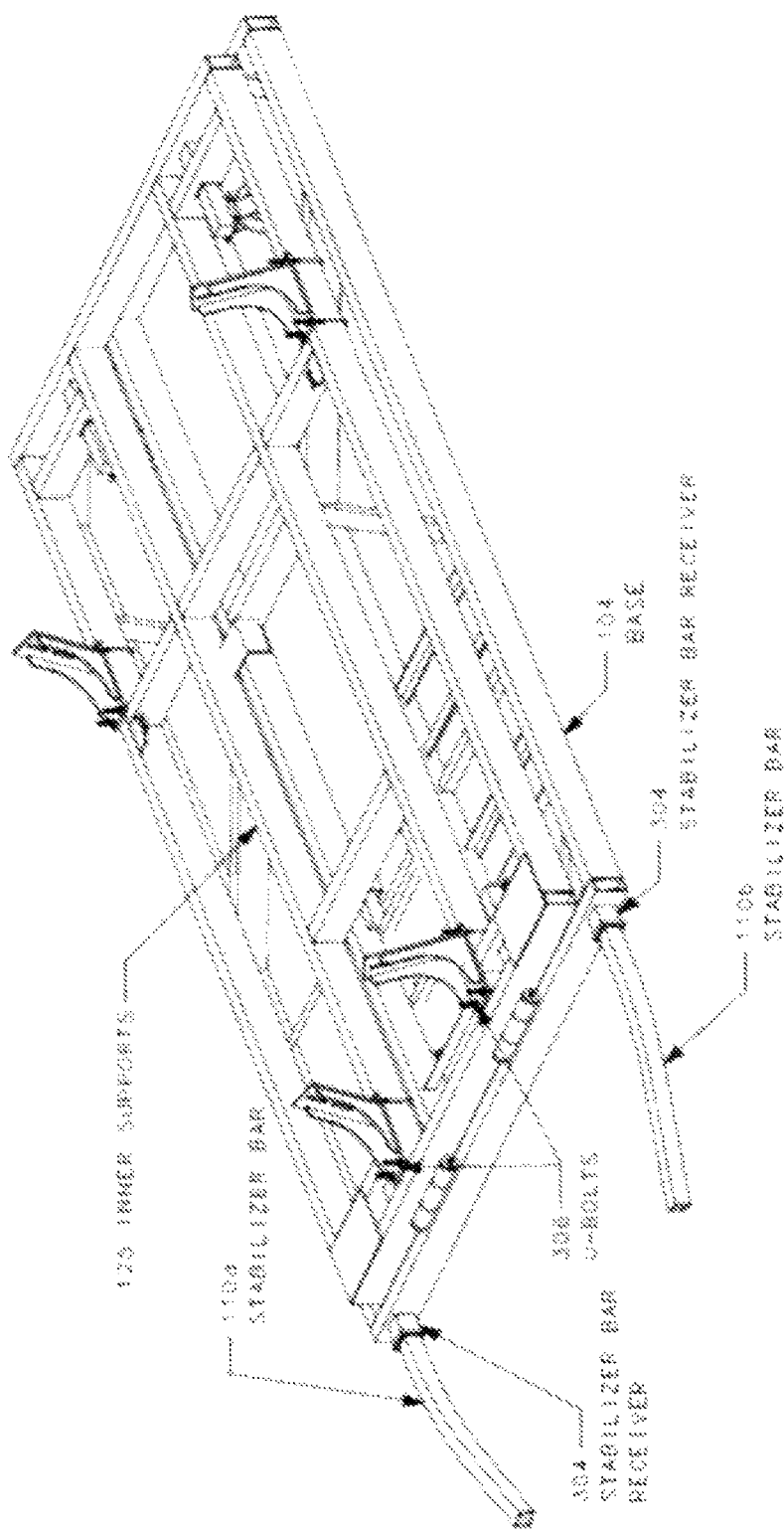
FIG. 3 is a detailed view of the boat lift.

FIG. 3 is a detailed view 200 of the hinged frame end 140 of the boat lift 100 at which the pivotal attachment occurs from FIG. 1. As previously described in connection with FIG. 1, the boat lift 100 includes stabilizer bars 110a and 110b. In some implementations, the stabilizer bars 110a and 110b are affixed to the base. In some implementations, the stabilizer bars can be attached to the base by welding, inserting the stabilizer bars into a specifically designed orifice, or any other attachment means of the like. For example, the stabilizer bars can be attached to the base with a stabilizer bar support 304.

In some implementations, the stabilizer bar supports are formed directly onto the base 104 of the hydraulic lift. In some implementations, the stabilizer bar supports 304 are attached to the base by a mechanism that enables a secure connection to the base of the boat lift 100. For example, the stabilizer bar supports 304 can be welded to the base 104.

In some implementations, the stabilizer bar support 304 can include other mechanisms to secure the stabilizer bars such as a slot and pin where the stabilizer bars 110a and 110b slide into the stabilizer bar support then is secured within the stabilizer bar support via a securing pin. Generally, the securing pin is inserted into the holes within the stabilizer bars 110a and 110b and the stabilizer bar supports 304 and secured with a cotter pin or some other similar mechanisms. In other implementations, the securing pin can include a similar securing mechanism such as a screw, bolt, push and release buttons, and other mechanisms of the like.

As previously discussed in connection with FIG. 2, the boat support 102 includes frame stops 208a-d. FIG. 3 shows the frame stops 208c, d. In some implementations, the frame stops 208c, d are attached to some portion of the top of the boat support 102. In other implementations, the frame stops 108a-d can be attached to the boat support 102 via attaching mechanisms such as being welded to the boat support 102, double-threaded bolts and nuts, or any other mechanism of the like.

For example, the frame stops 208a-d can be attached to the boat support with U-bolts 306 and nuts. In some implementations, the U-bolts fit around an inner support member 125 then are inserted into holes within the base of the frame stops 208a-d.

Typically, the frame stops 208a-d are attached to the boat support 102 and extend away from the base 102 of the boat lift 100. In addition, the one or more frame stops are typically attached to the boat support 102 at locations corresponding to crossbars and/or longitudinal bars of the boat trailer. In some implementations, the frame stops 108a-d can be relocated to a different location on the boat support 102 to accommodate different sized trailers and boats. Further, the one or more frame stops 208a-d are attached to the boat support in a manner that causes the one or more frame stops to engage a boat trailer when the boat support 102 is pivoted relative to the base 104.

Figure 4:
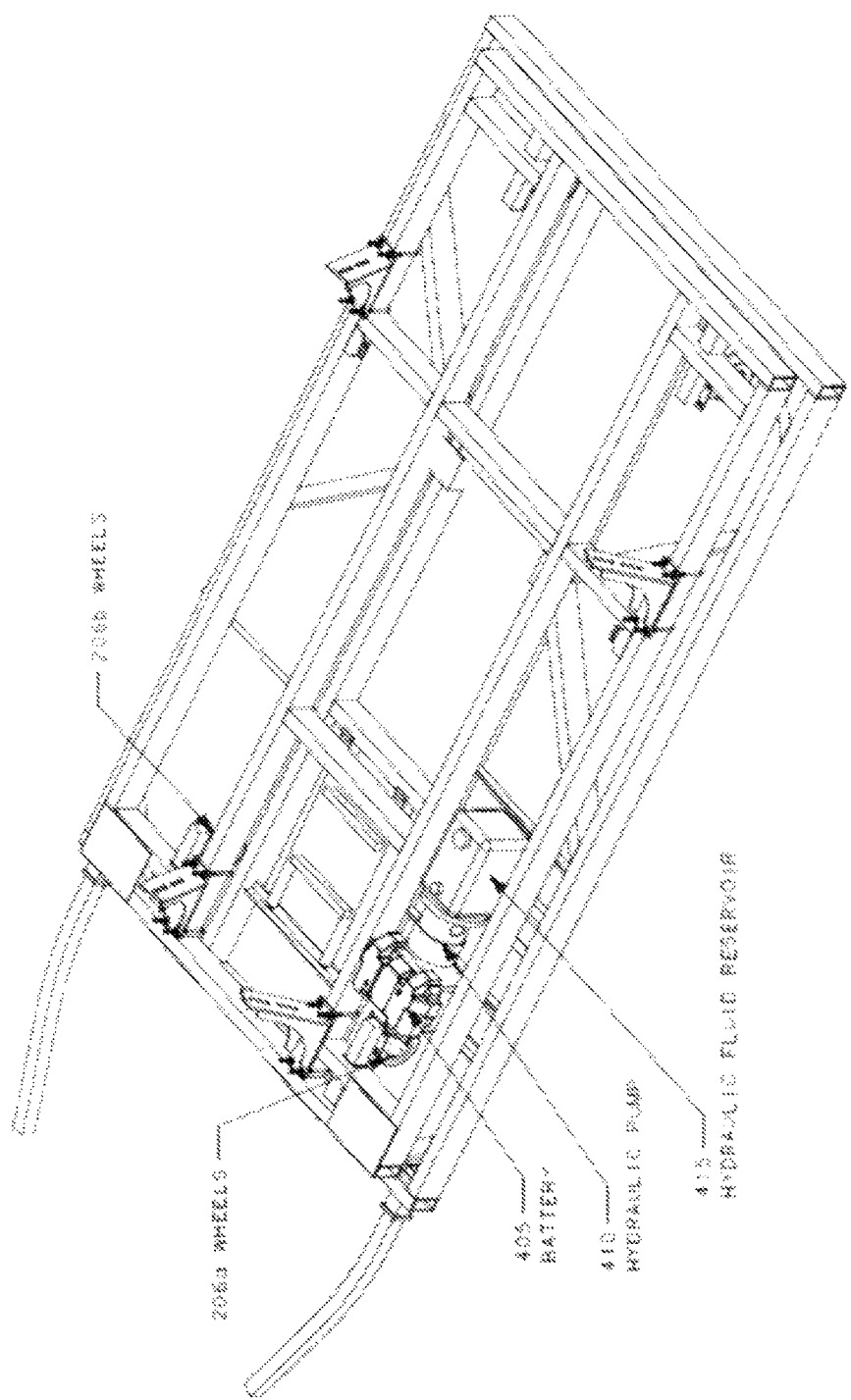
FIG. 4 is another diagram of the example boat lift.

FIG. 4 is another diagram of the example boat lift 100 in a collapsed position. As previously described with reference to FIG. 2, the boat lift 100 can include wheels 206a-d. In some implementations, when the boat lift 100 is in the collapsed position 300, the wheels 206a-d engage a surface, which lifts the base 104 from the ground and allows the boat lift 100 to be rolled on the wheels 206a-d.

In some implementations, the boat lift 100 can support auxiliary equipment such as a battery 405, a pump 410, and a hydraulic fluid reservoir 415 that is located on the equipment rack 212. Typically, the battery 405 provides electric power to the pump 410. The pump 410 moves hydraulic fluid from the hydraulic fluid reservoir 415 into the hydraulic cylinder 118, thereby forcing the hydraulic cylinder 118 to extend the extendable portion 217 and raise the opposite side of the boat support 102.

In some implementations, when the boat lift 100 is collapsed, the boat support 102 returns to the collapsed position. Generally, during the collapsing process, the pump moves hydraulic fluid from the hydraulic cylinder back to the hydraulic fluid reservoir 415.

Figure 5:
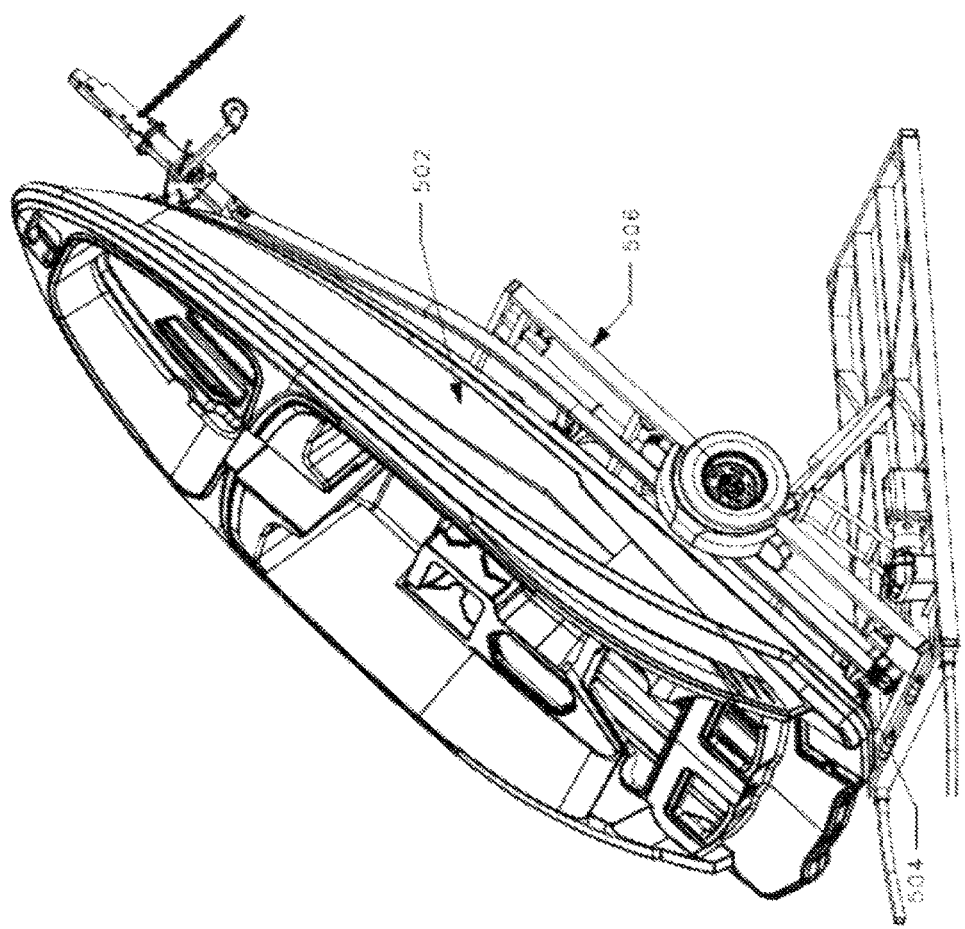
FIG. 5 is another diagram of the example boat lift.

FIG. 5 is another diagram of the example boat lift 100 in the elevated position with a boat 105 loaded on the boat lift, similar to FIG. 1. As illustrated by FIG. 5, the boat lift 100 can include securing members 502 that connect between the boat lift 100 and a boat.

In some implementations, the securing member 502 can be chains, belts, a come-along system, or any other securing means of the like. For example, the securing member 502 can be a strap that connects between the stern eye 404 of the boat 105 and a given portion 506 of the boat support 102. The straps can be connected in a crisscross manner to ensure additional stability for the boat 402 as it rests on the boat lift. Typically, the straps are affixed to the stern eyes 504 and the boat support 102 prior to elevating the boat.

Typically, the securing members 502 ensure the boat 105 and/or the boat trailer remain secured to the boat lift while the boat lift is in the elevated position. Typically, the securing member 502 attaches to the boat support 102 and to the boat 105 that is resting on the boat support.

Figure 6:
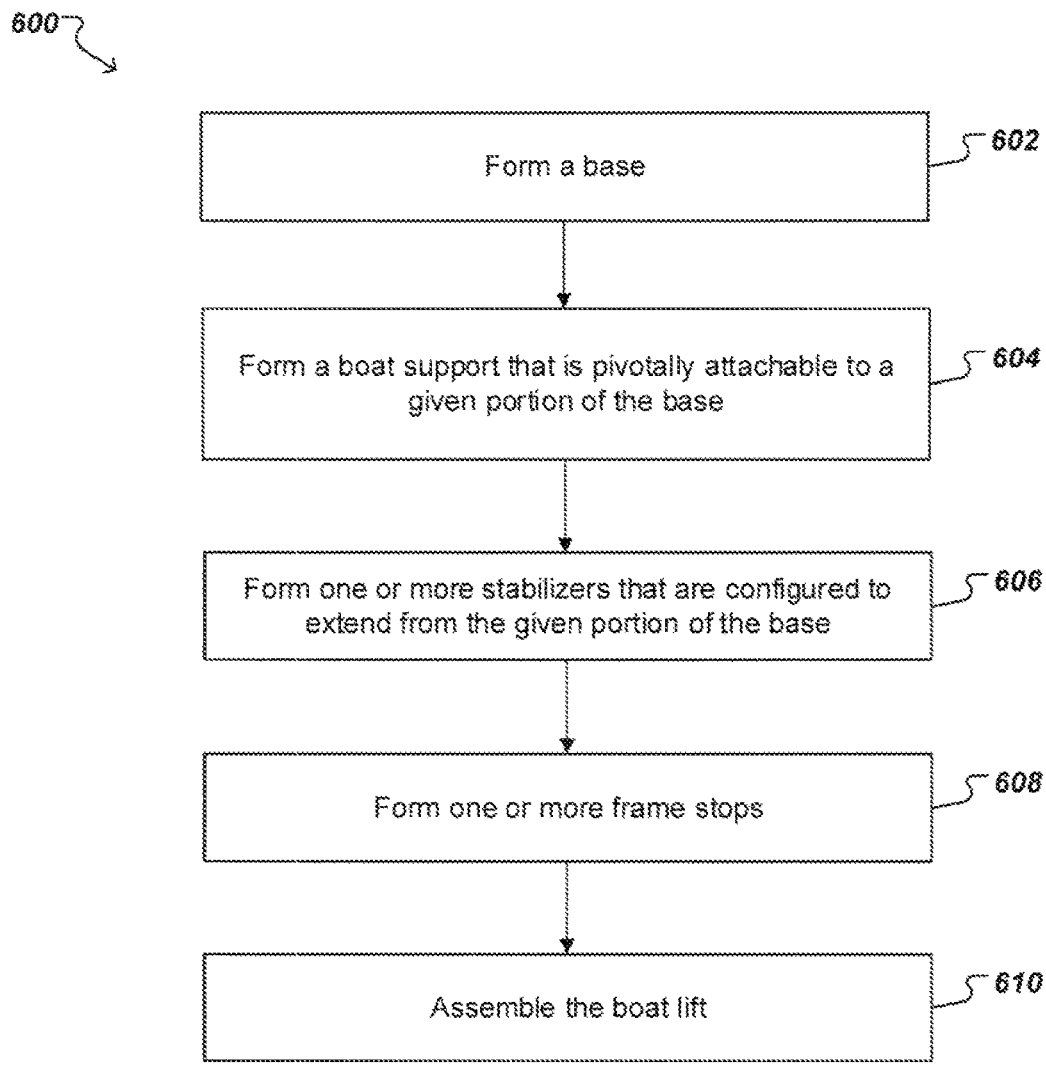
FIG. 6 is a flow diagram of an example process for providing a boat lift.

FIG. 6 is a flow diagram of an example process 600 for creating a boat lift. The example process 600 can include forming a base (602). As previously described in connection with FIG. 1, the base typically has an outer frame 115 that includes inner support members 125, and can be made of various materials. The base can be formed using molds, by connecting portions of the outer frame 115 and inner support members 125 by way of welding or using fasteners to connect the outer frame and inner support members 125. The base can also be formed to receive stabilizer bars at one end of the base. For example, the base can include slots in which the stabilizer bars can be inserted or protrusions to which the stabilizer bars can be attached.

The example process 600 can also include forming a boat support that is pivotally attachable to a given portion of the base (604). The boat support can be formed to have a portion that interfaces with the base to facilitate a pivotal connection between the boat support and the base. For example, the portion of the boat support can be formed in a manner that enables the boat support to be pivotally attached to the base by a connecting mechanism, as illustrated by FIGS. 1, 2, 3, and 5. In a particular example, the boat support can be formed to connect to the base with hinges, as illustrated in FIG. 1.

The example process 600 can include forming on or more stabilizers that are configured to extend from the given portion of the base (606). The stabilizer can be formed in manner similar to the stabilizer bars 110a and 110b shown in FIG. 1. In some implementations, the stabilizers are formed to be inserted into slots of the base. In some implementations, the stabilizers are formed to be attached to protrusions extending from the base. For example, the stabilizers can be slid over the protrusions.

The example process 600 can also include forming one or more frame stops that are configured to extend away from the base (608). The frame stops can be attached to the inner support members that are included within the boat support. The frame stops can be formed with an open face that engages a boat and/or a boat trailer that is placed on the boat support. For example, the frame supports can be formed similar to frame stops 208a-d shown in FIG. 2.

The process 600 can include assembling the boat lift (608) in a configuration similar to the boat lift illustrated in FIGS. 1-5. In some implementations, the boat support is pivotally connected to the base at a given end by a connecting mechanism. The stabilizer bars can be attached to the given end of the base. In addition, the frame stops can be attached to inner support members of the boat support by a connecting mechanism. For example, the frame supports may be attached to the inner support members with U-bolts and nuts or they may be welded to the inner support members. In some implementations, the frame stops can be attached to the boat support at different locations to support different size boats and/or boat trailers.

Particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results.

What is claimed is:

1. A boat lift, comprising:
    a base comprising a frame with a bottom surface configured to rest on a floor surface or ground surface;

a boat support having a first end pivotally attached to a given portion of the base and having a second end that is (i) opposite of the first end and (ii) elevated above the first end as the boat support is pivoted relative to the base;

one or more stabilizers attached to and extending away from the given portion of the base in a plane defined by the base, the one or more stabilizers configured to engage the floor surface or ground surface; and two or more wheels attached to the boat support, the two or more wheels configured to: (i) engage the floor surface or ground surface while the boat support is in a collapsed position relative to the base such that the bottom surface of the frame is separated from the floor surface or ground surface, and to (ii) separate from the floor surface or ground surface while the boat support is pivoted to an elevated position relative to the base such that the bottom surface of the frame rests directly on the floor surface or ground surface.

2. The boat lift of claim 1, wherein the one or more stabilizers are arranged to prevent the base from rotating about the given portion of the base when the boat support pivots at the given portion of the base.

3. The boat lift of claim 1, wherein the base includes at least one stabilizer attachment point at which the one or more stabilizers are directly attached to the given portion of the base.

4. The boat lift of claim 3, wherein the stabilizer attachment point comprises a stabilizer slot into which the one or more stabilizers are inserted to attach the one or more stabilizers to the base.

5. The boat lift of claim 1, comprising a lift support structure that extends between the base and the boat support when the boat support is positioned at a given angle relative to the base and maintains the given angle between the boat support and the base.

6. The boat lift of claim 5, wherein the lift support structure is pivotally attached to an interior portion of the base and pivots to engage the boat support at the given angle.

7. The boat lift of claim 1, further comprising a lift mechanism connected to each of the base and the boat support in a manner that enables the lift mechanism to position the boat support at various angles relative to the base.

8. The boat lift of claim 7, further comprising a support structure that extends between the lift mechanism and the base when the boat support is positioned at a given angle relative to the base.

9. The boat lift of claim 7, wherein the lift mechanism comprises an actuator connected between the boat support and the base in a manner that enables the actuator to position the boat support to at least a 45 degree angle relative to the base.

10. The boat lift of claim 1, further comprising one or more frame stops attached to the boat support and extending away from a plane of the boat support.

11. The boat lift of claim 10, wherein the one or more frame stops are attached to the boat support at locations at which crossbars of a boat trailer will be positioned upon mounting the boat trailer on the boat lift.

12. The boat lift of claim 10, wherein the one or more frame stops are attached to the boat support in a manner that causes the one or more frame stops to engage a boat trailer when the boat support is pivoted relative to the base.

13. The boat lift of claim 1, further comprising a securing member attached to the boat support, wherein the securing member is configured to attach to a boat supported by the boat support.

14. The boat lift of claim 1, wherein:

the given portion of the base is located between two ends of the base; and the one or more stabilizers comprise one of the two ends.

* * * * *